United States Patent [19]

Hansen et al.

[11] 3,993,153
[45] Nov. 23, 1976

[54] BOTTOM GUARD ARRANGEMENT FOR A TRACK-TYPE VEHICLE

[75] Inventors: David D. Hansen, East Peoria, Ill.; Eugene Sweeney, Sao Paulo, Brazil

[73] Assignee: Caterpillar Tractor Co., Peoria, Ill.

[22] Filed: Dec. 10, 1975

[21] Appl. No.: 639,333

[52] U.S. Cl. ............................. 180/69.1; 180/92 R
[51] Int. Cl.² ....................................... B62D 25/20
[58] Field of Search ................. 180/69.1, 54 D, 6.7, 180/9.2 R, 1 F; 305/60

[56] References Cited
UNITED STATES PATENTS

| | | | |
|---|---|---|---|
| 1,429,449 | 9/1922 | Norelius | 180/54 D X |
| 3,645,350 | 2/1972 | Deli et al. | 180/69.1 X |
| 3,670,835 | 6/1972 | Ross et al. | 180/69.1 |
| 3,754,615 | 8/1973 | McIndoo et al. | 180/69.1 |
| 3,866,939 | 2/1975 | Fanslow | 180/69.1 X |
| 3,927,729 | 12/1975 | Gianessi | 180/69.1 |

*Primary Examiner*—Joseph F. Peters
*Assistant Examiner*—Milton L. Smith
*Attorney, Agent, or Firm*—John W. Grant

[57] ABSTRACT

A bottom guard arrangement for a track-type vehicle includes a front guard detachably secured to a longitudinally extending frame ahead of a hard bar extending between a pair of track assemblies, and a rear guard detachably secured to the frame rearwardly of the hard bar and spaced from the front guard. An intermediate guard has its forward end inserted into a transversely extending socket formed on the front guard, a plurality of holes extending therethrough at its rearward end, and a matching number of recessed pockets circumscribing the holes. A plurality of bolts individually extend through the holes of the intermediate guard for detachably securing the rearward end thereof to the rear guard with each of the bolts having its head disposed within the respective pocket. A shear block is welded to the rear guard at the rearward end of the intermediate guard for engagement with a force transmitting surface formed on the intermediate guard to transmit both rearwardly directed longitudinal forces and lateral forces applied to the intermediate guard directly to the rear guard.

5 Claims, 4 Drawing Figures

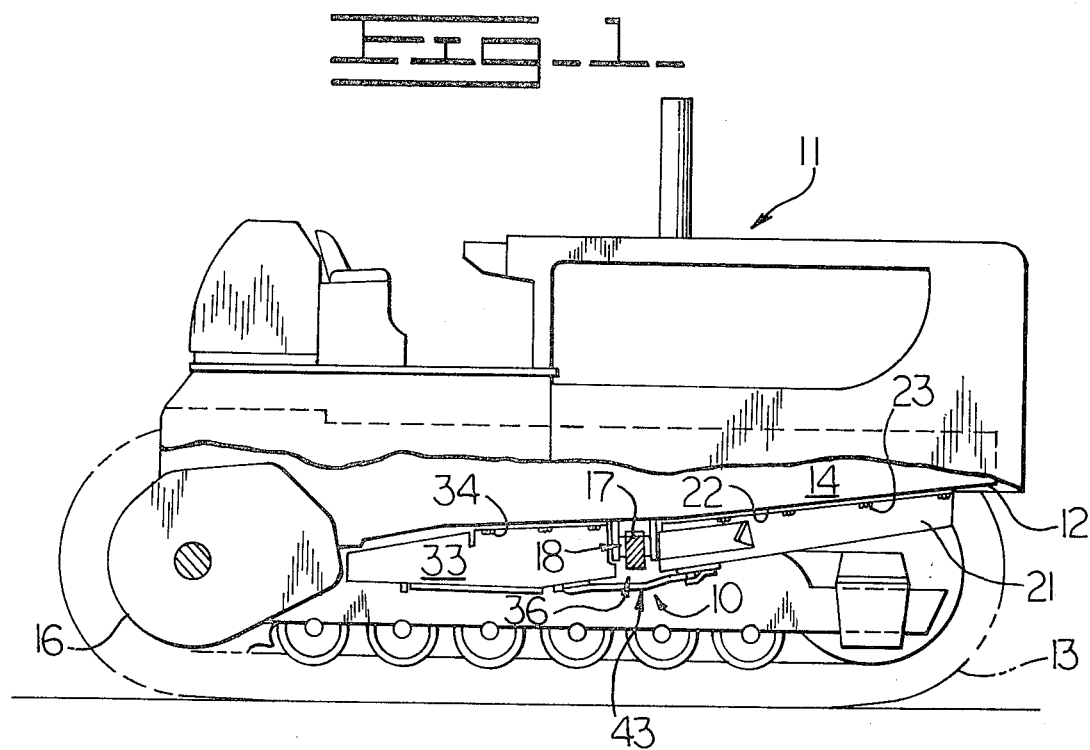
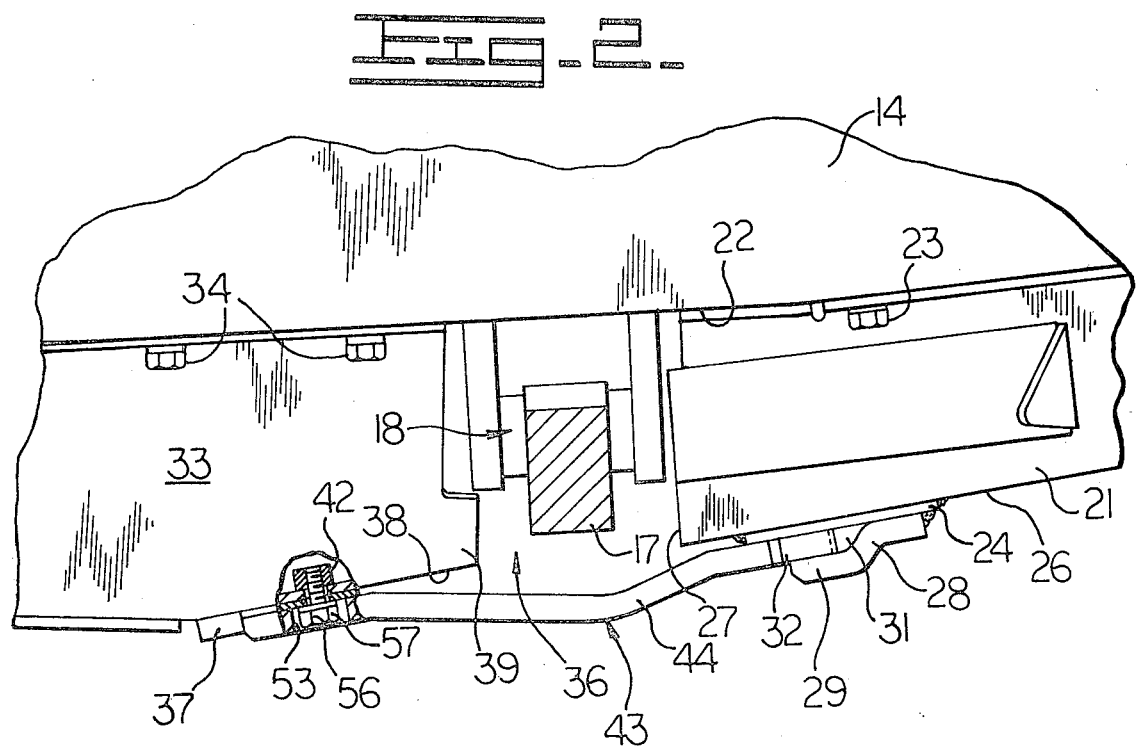

BOTTOM GUARD ARRANGEMENT FOR A TRACK-TYPE VEHICLE

BACKGROUND OF THE INVENTION

This invention relates to track-type vehicles and more particularly to a bottom guard arrangement removably attached thereto.

Crawler tractors employed in the earthmoving industry commonly have a crankcase guard attached to the underneath side of the frame to prevent damage to the engine crankcase, transmission cover, and other vulnerable components at the underneath side of the vehicle. The guards frequently include a front member and a rear member disposed ahead and rearwardly, respectively, of the hard bar which extends between the track assemblies. Constructing the guard from two separate members facilitates its removal for servicing of the engine and other vehicle components and provides a space therebetween to permit normal oscillation of the hard bar during operation of the vehicle. The space is partially covered by an intermediate plate removably secured to the front and rear members by a plurality of bolts. One of the problems encountered with such arrangements is that the entire crankcase guard is subjected to sliding contact with protruding rocks, logs, mud, etc., and the bolts fastening the intermediate plate to the front and rear members are frequently worn so badly that they must be burned off with a torch for removal of the crankcase guard for servicing of the components protected by the guard. Also, in some cases, the impact between the intermediate plate and protruding objects is sufficient to shear the supporting bolts in which case immediate repairs are necessary to maintain the protection afforded by the guards.

OBJECTS OF THE INVENTION

Accordingly, an object of this invention is to provide an improved bottom guard arrangement for a track-type vehicle which is easily removable for servicing the components protected by the guard.

Another object of this invention is to provide such an improved bottom guard arrangement which is durably constructed and capable of withstanding considerable abuse without failing of the fasteners employed to fasten together the various components of the guard arrangement.

Another object of this invention is to provide an improved bottom guard arrangement of the character described which minimizes wear to the supporting fasteners thereby simplifying removal thereof for servicing of the components protected by the guard.

Other objects and advantages of the present invention will become more readily apparent upon reference to the accompanying drawings and following description.

BRIEF DESCRIPTION OF THE DRAWINGS

FIG. 1 is a side elevational view of a bottom guard arrangement embodying the principles of the present invention operatively secured to a track-type vehicle which has the track assembly on the near side removed for illustrative convenience.

FIG. 2 is an enlarged fragmentary elevational view of the bottom guard arrangement of FIG. 1.

DESCRIPTION OF THE PREFERRED EMBODIMENT

Figure 3:
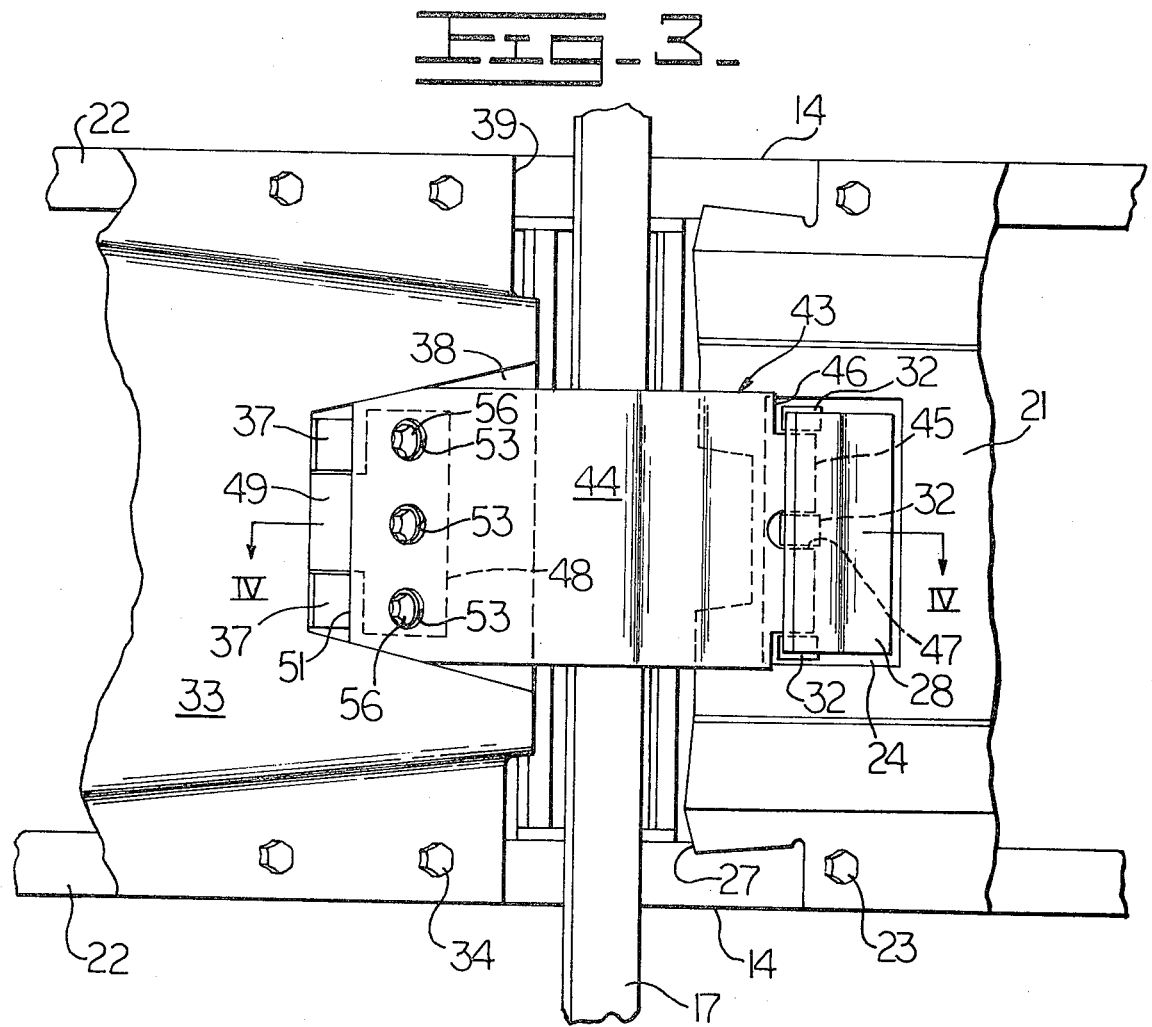
FIG. 3 is a bottom plan view of the bottom guard arrangement.

Referring now to the drawings, a bottom guard arrangement embodying the principles of the present invention is generally indicated by the reference numeral 10 in association with a track-type vehicle 11. The track-type vehicle is of the usual type having a longitudinally extending main frame 12 and a pair of parallel track assemblies, one shown at 13, disposed at opposite sides of the main frame. The main frame has a pair of longitudinally extending laterally spaced frame members 14 extending forwardly from a bevel gear case 16 disposed at the rearward end of the vehicle. A transversely disposed hard bar 17 is pivotally secured at 18 to the main frame with its opposite ends operatively connected to the track assemblies in the usual manner.

The bottom guard arrangement of the present invention includes a front crankcase guard 21 disposed forwardly of the hard bar 17 and detachably secured to a bottom surface 22 of the frame members 14 by a plurality of fasteners such as bolts 23 to enclose the space between the frame members forwardly of the hard bar. A laterally extending cross plate 24 is welded to a bottom surface 26 of the front guard forwardly of its rearward end 27. A transversely extending formed plate 28 is in turn welded to the cross plate and has a rearwardly extending portion 29 spaced from and disposed parallel to the cross plate and bottom surface 26 forming a transversely disposed rearwardly opening plate receiving socket 31. A plurality of laterally spaced shear blocks 32 are partially disposed within the socket and welded to the cross plate. Thus, in effect, the plate 28 and shear blocks 32 are nonremovably secured to the front guard.

Figure 4:
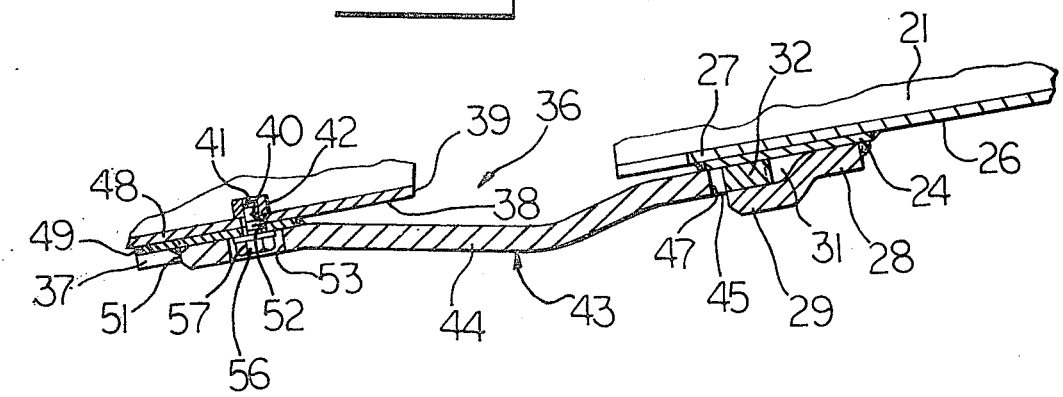
FIG. 4 is a cross sectional view taken along line IV—IV of FIG. 3.

A rear transmission guard 33 is disposed rearwardly of the hard bar 17 and is detachably secured to the bottom surface 22 of the frame members 14 by a plurality of fasteners such as bolts 34 to enclose the span between the frame members rearwardly of the hard bar. The rear guard is spaced from the front guard forming an opening 36 therebetween to permit oscillation of the hard bar during operation of the vehicle. A pair of laterally spaced shear blocks 37 are welded to the bottom surface 38 of the rear guard member rearwardly of its forward end 39. A plurality of holes 40 extend through the rear guard and are in alignment with a plurality of threaded holes, one shown at 41 in FIG. 4, provided in an elongated strip 42 welded to the inner surface of the rear guard.

An intermediate guard 43 includes an elongated plate 44 which spans the opening 36 between the front and rear guards 21 and 33, respectively and has its forward end 45 extending into the plate receiving socket 31. A notch 46 is formed at each of the forward corners of the plate and a rearwardly extending notch 47 is formed in the forward end intermediate the notches 46 to receive the shear blocks 32 for limiting lateral movement of the forward end of the intermediate guard and for transmitting lateral forces applied to the intermediate guard through the shear blocks and directly into the front guard. A T-shaped plate 48 is welded to the upper surface of the plate 44 and has a rearwardly extending tank 49 disposed between the shear blocks 37 welded to the rear guard. The width of the tang is slightly less than the space between the shear blocks for a later defined purpose. A rear edge 51 of the plate 44 is in abutment with the shear blocks 37 for transmitting rearwardly directed longitudinal forces directly into the rear guard. A plurality of holes, one shown at 52 in FIG. 4, extend through the plate 48 in substantially axial alignment with the threaded holes 41. An equal number of larger holes 53 are provided in the plate 44 coaxial with the holes forming a recess. A plurality of bolts 56 extend through the holes 52 and are screw threaded into the threaded holes 41 for removably fastening the rearward end of the intermediate guard to the rear guard. The heads 57 of the bolts are disposed within the recesses formed by the holes 53. The diameters of the holes 52 are larger than the shanks of the bolts providing a slight space therebetween with the size of the space chosen to ensure that the lateral forces applied to the intermediate guard are transmitted to the rear guard by contact between the tang 49 and the appropriate one of the shear blocks 37 rather than through the bolts 56. The width of the space between the shear blocks and the tang is selected to compensate for manufacturing tolerances while ensuring engagement therebetween before engagement occurs between the plate 48 and the bolts.

In view of the foregoing, it is readily apparent that the structure of the present invention provides an improved bottom guard arrangement for a track-type vehicle which is readily removable for servicing the components protected by the guard. The forward end of the intermediate guard is inserted into a socket formed on the front guard while the rearward end is secured to the rear guard by a plurality of bolts which have their heads disposed within recessed pockets formed in the intermediate guard. Thus, the heads of the bolts are protected from sliding contact with protruding objects and thus wear to the he of the bolts is virtually eliminated. The tang, rear edge and the notches formed on the forward end of the intermediate guard serve as force transmitting surfaces and cooperates with the shear blocks to transmit both longitudinal and laterally applied forces directly to the respective front or rear guards rather than through the bolts. Thus, shearing loads on the bolts is also virtually eliminated. Also, the particular mounting arrangement provides a limited floating relationship between the intermediate guard and the front and rear guards. Thus, the external forces applied to either the front or rear guard are not transmitted through the intermediate guard to the other guard.

While the invention has been described and shown with particular reference to the preferred embodiment, it will be apparent that variations might be possible that would fall within the scope of the present invention which is not intended to be limited except as defined in the following claims.

What is claimed is:
1. A bottom guard arrangement for a track-type vehicle having a longitudinally extending frame, a pair of parallel track assemblies disposed at opposite sides of the frame and an elongated hard bar extending laterally between the track assemblies and pivotally connected to the frame, comprising:
 a front guard detachably secured to the frame forwardly of the hard bar;
 a rear guard detachably secured to the frame rearwardly of the hard bar and spaced from the front guard;
 means forming a transversely extending socket on the front guard;
 an intermediate guard having a forward end inserted into the socket, a rearward end, force-transmitting surface means formed thereon at the rearward end, a plurality of holes extending therethrough at its rearward end, and a matching number of recessed pockets circumscribing the holes;
 a plurality of bolts individually extending through the holes in the intermediate guard detachably securing the rearward end of the intermediate guard to the rear guard, each of said bolts having a head protectively disposed within the respective pocket; and
 shear block means welded to the rear guard at the rearward end of the intermediate guard for engagement with the force-transmitting surface means to transmit both rearwardly directed longitudinal forces and lateral forces applied to the intermediate guard plate directly to the rear guard.

2. The bottom guard arrangement of claim 1 wherein said socket is formed by a formed plate nonremovably secured to the front guard and having a rearwardly extending portion spaced from and parallel to the front guard.

3. The bottom guard arrangement of claim 2 wherein the force-transmitting surface means includes a tang protruding rearwardly from the rearward end of the intermediate guard and a rearward edge formed on the intermediate guard.

4. The bottom guard arrangement of claim 3 wherein the shear block means includes a pair of shear blocks welded to the rear guard and disposed on opposite sides of the tang.

5. The bottom guard arrangement of claim 4 including a plurality of shear blocks disposed within the socket and nonremovably secured to the front guard, and means forming a plurality of notches at the forward end of the intermediate guard for engagement with the shear blocks for transmitting lateral forces applied to the forward end of the intermediate guard directly to the front guard.

* * * * *